(No Model.)
C. E. BELL.
BOLT AND NUT LOCK.
No. 268,607. Patented Dec. 5, 1882.
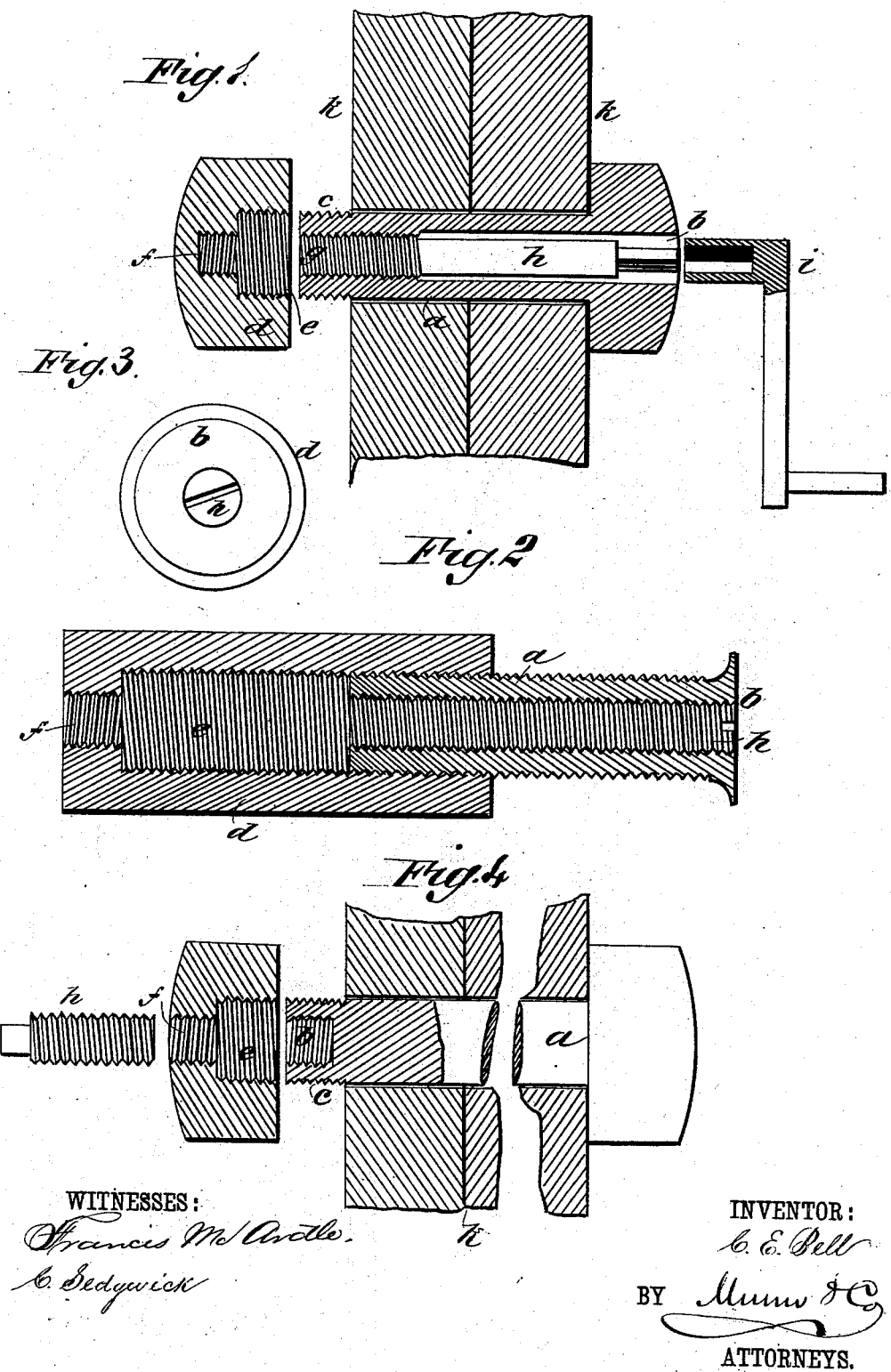
WITNESSES:
Francis McArdle.
C. Sedgwick
INVENTOR:
C. E. Bell
BY Munn & Co
ATTORNEYS.

UNITED STATES PATENT OFFICE.

CHARLES E. BELL, OF GREENFIELD, OHIO.

BOLT AND NUT LOCK.

SPECIFICATION forming part of Letters Patent No. 268,607, dated December 5, 1882.

Application filed October 11, 1882. (No model.)

*To all whom it may concern:*

Be it known that I, CHARLES E. BELL, of Greenfield, in the county of Highland and State of Ohio, have invented a new and Improved Bolt and Nut Lock, of which the following is a full, clear, and exact description.

The object of the invention is to combine a nut and bolt with a binding-screw, so that neither bolt nor nut can work loose.

Reference is to be had to the accompanying drawings, forming part of this specification, in which similar letters of reference indicate corresponding parts in all the figures.

Figure 1 is a longitudinal section of a bolt contrived with my improved locking device, together with a couple of bridge-plates or bars to be fastened by the bolt. Fig. 2 is a partly-sectional elevation of a modified form of the bolt and nut, and Fig. 3 is an elevation of the head of the bolt of Fig. 2, and Fig. 4 shows my invention as applied to a long bolt.

The bolt $a$ is constructed with a central bore, $b$, through it longitudinally, which is internally screw-threaded partly or wholly throughout its length, the threads being pitched reversely to the threads $c$ on which the socket $e$ of the nut $d$ is to screw for drawing up the bolt on the plates $k$. The nut $d$ has another socket or bore, $f$, threaded to receive the end $g$ of a binding-screw, $h$, which is screwed in from the head of the bolt by a wrench, $i$, or screw-driver, after nut $d$ is screwed on.

For long bolts the application of my invention is shown in Fig. 4, in which the socket $f$ is extended to form a bore entirely through the nut, and the bore $d$ of the bolt extends into the end of the same but a short distance, forming a socket into which, through the nut, the locking-screw $h$ is inserted. It will be seen that any tendency of the nut $d$ or bolt $a$ to work loose will be resisted by the tightening of the binding-screw, which will thus effectually keep the nut $d$ tight on the bolt.

I am aware that a nut has been locked to a bolt by conically tapping the threaded inside of nut, splitting the threaded centrally-perforated end of bolt, and forcing a conical screw between said split ends; also, that two screws have been locked by screwing them together, one within the other, from opposite directions and with reversed threads; but

What I claim as new is—

The combination of a bolt having a central bore entirely through it, and reverse threads on the inside and outside of its lower end, the nut $d$, having the reversed threads $e f$, and the locking-screw $h$, having a thread, $g$, corresponding to the internal thread of screw-bolt and the nut-thread $f$, whereby the nut is prevented from turning in either direction until the locking-bolt is withdrawn, as described.

CHAS. EDWIN BELL.

Witnesses:
 W. W. BELL,
 JNO. McGARRAUGH.